(12) United States Patent
Bai et al.

(10) Patent No.: US 6,828,050 B2
(45) Date of Patent: Dec. 7, 2004

(54) FUEL CELL

(75) Inventors: Lijun Bai, Spokane, WA (US); Wade A. Huravitch, Spokane, WA (US); David R. Lott, Spokane, WA (US); Vanell L. Martin, Spokane, WA (US)

(73) Assignee: Relion, Inc., Spokane, WA (US)

( * ) Notice: Subject to any disclaimer, the term of this patent is extended or adjusted under 35 U.S.C. 154(b) by 224 days.

(21) Appl. No.: 10/269,600

(22) Filed: Oct. 10, 2002

(65) Prior Publication Data

US 2003/0138682 A1 Jul. 24, 2003

Related U.S. Application Data

(63) Continuation-in-part of application No. 10/056,543, filed on Jan. 23, 2002, now Pat. No. 6,620,538.

(51) Int. Cl.⁷ .................................................. H01M 8/04
(52) U.S. Cl. ............................................ 429/23; 429/22
(58) Field of Search ...................................... 429/23, 22

(56) References Cited

U.S. PATENT DOCUMENTS

| | | |
|---|---|---|
| 6,030,718 A | 2/2000 | Fuglevand et al. |
| 6,096,449 A | 8/2000 | Fuglevand et al. |
| 6,218,035 B1 | 4/2001 | Fuglevand et al. |
| 6,620,538 B2 * | 9/2003 | Bai et al. ..................... 429/23 |

* cited by examiner

Primary Examiner—John S. Maples
(74) Attorney, Agent, or Firm—Wells St. John P.S.

(57) ABSTRACT

A fuel cell is disclosed and which includes an anode and a cathode and which produces a voltage output which is supplied to a load; an electrical energy storage device is provided; and a controller is electrically coupled to the fuel cell, and which periodically shunts the voltage output of the fuel cell between the anode and cathode by electrically coupling the electrical energy storage device to the anode and cathode of the fuel cell.

36 Claims, 1 Drawing Sheet

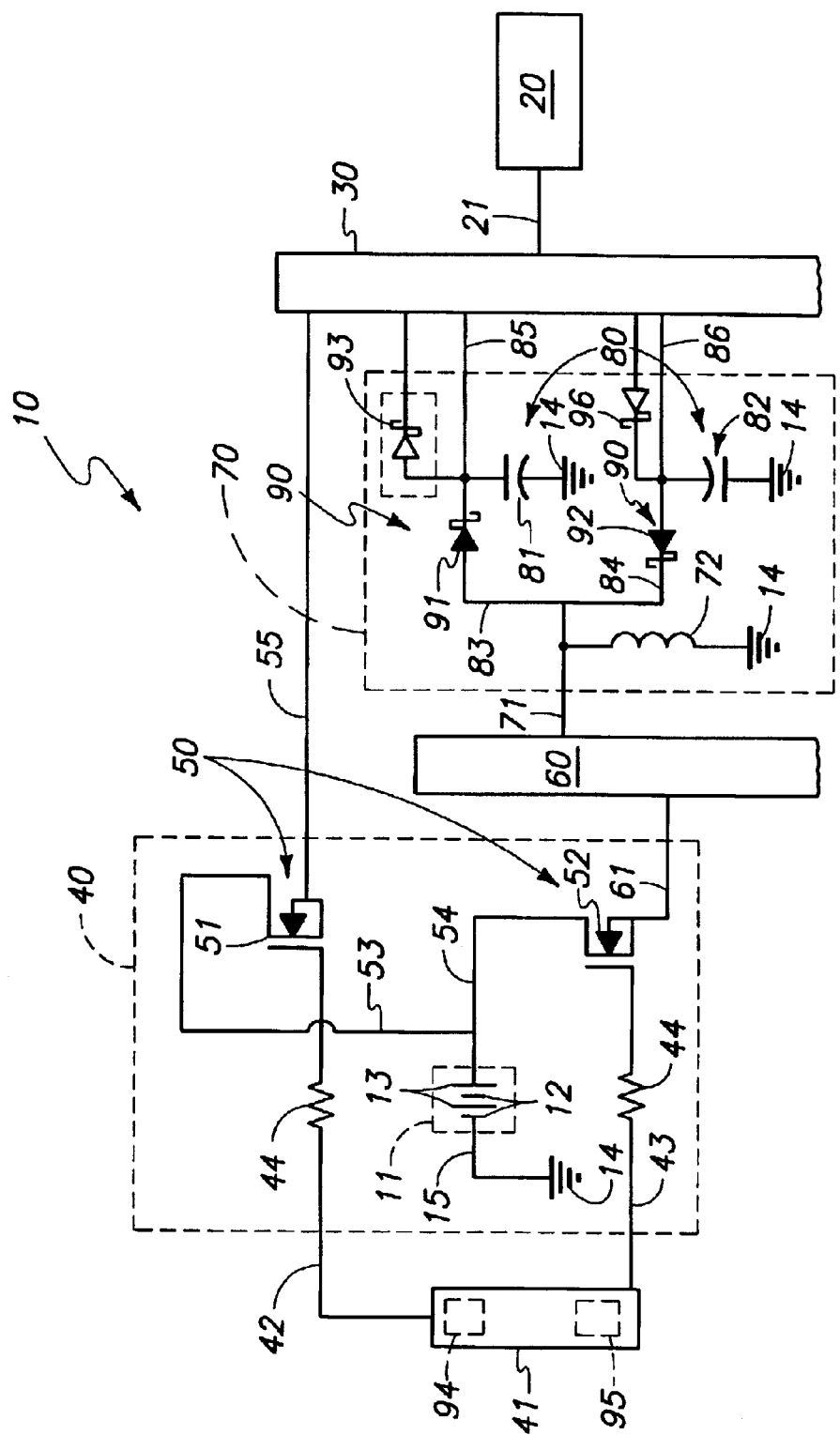

FUEL CELL

CROSS REFERENCE TO RELATED APPLICATION

This application is a continuation-in-part of Ser. No. 10/056,543, and which is entitled Method and Apparatus for Monitoring Equivalent Series Resistance and for Shunting a Fuel Cell and which was filed on Jan. 23, 2002, now U.S. Pat. No. 6,620,538, and which is incorporated by reference herein.

TECHNICAL FIELD

The present invention relates to a fuel cell, and more specifically to a fuel cell having an electrical circuit for shunting electrical power between the anode and cathode to improve the performance of the fuel cell and which further incorporates an energy storage device in combination with the electrical circuit which performs the shunting.

BACKGROUND OF THE INVENTION

Fuel cells are well known in the art. A fuel cell is an electrochemical device which reacts a fuel and an oxidant to produce electricity and water. A typical fuel supply provided to a fuel cell is hydrogen, and a typical oxidant supply provided to a fuel cell is oxygen (or ambient air). Other fuels or oxidants can be employed depending upon the nature of the fuel cell and the design.

The basic process in a fuel cell is highly efficient, and for those fuel cells fueled directly by hydrogen, are substantially pollution free. Further, since fuel cells can be assembled into stacks of various sizes, fuel cell power systems have been developed to produce a wide variety of electrical power outputs, and thus can be employed in numerous commercial applications. As was discussed in our parent application, U.S. application Ser. No. 10/056,543, and which was filed Jan. 23, 2002 and which is incorporated by reference herein, the inventors disclosed a fuel cell having a controller which is electrically coupled to same, and which is configured to selectively electrically short the anode to the cathode of the fuel cell, and which further includes circuitry configured to measure the resistance of the fuel cell in timed relation to the electrical shorting. As disclosed in U.S. Pat. No. 6,096,449 the teachings of which are also incorporated by reference herein, a shunt and controller circuitry are disclosed and which periodically electrically shorts current between the anode and cathode of a fuel cell while simultaneously allowing the substantially continuous delivery of the fuel gas to the fuel cell. This periodic shunting has been shown to increase the overall electrical power output of the fuel cell. Still further, it is speculated that repeated and periodic electrical shorting causes each of the fuel cells to be "conditioned," that is, such shorting is believed to cause an increase in the amount of water that is made available to the membrane electrode assembly (MEA) of the fuel cell thereby increasing the MEA performance by providing more uniform hydration. Still further, it is speculated that the electrical shorting provides a short term increase in heat dissipation that is sufficient to evaporate excess water from the diffuser layers which are often incorporated or made integral with the membrane electrode assemblies.

It is speculated that this evaporation of water caused by this periodic electrical shorting makes more oxygen from the ambient air available to the cathode side of the membrane electrode assembly. Whatever the ultimate cause, the electrical shorting appears to increase proton conductivity of the membrane electrode assembly. This increase in proton conductivity results in a momentary increase in the electrical power output of the fuel cell which diminishes slowly over time. The overall increase in the electrical power output of the fuel cell, as controlled by the adjustably sequential and periodic electrical shorting of individual and groups of fuel cells, results in an increase in the overall electrical power production of the entire serially connected group of fuel cells.

While the above discussed arrangements, and schemes have worked with a large degree of success, one noted shortcoming apparent in their design is that the electrical power that is shunted between the anode and cathode is largely lost during the shunting interval. Therefore, it would be advantageous to provide a fuel cell which provides the benefits provided by the prior art teachings, but which avoids the perceived shortcomings individually associated therewith. These and other aspects of the present invention will be discussed in greater detail below.

SUMMARY OF THE INVENTION

A first aspect of the present invention is to provide a fuel cell having an anode and a cathode and which produces a voltage output which is supplied to a load; an electrical energy storage device; and a controller electrically coupled to the fuel cell and which periodically shunts the voltage output of the fuel cell between the anode and cathode by electrically coupling the electrical energy storage device to the anode and the cathode of the fuel cell.

Still another aspect of the present invention relates to a fuel cell having an anode and a cathode, and which produces an electrical current having a voltage output and which is delivered to a load, and which includes an electrical energy storage device which is selectively electrically coupled to the fuel cell, and which is further selectively electrically coupled to the load; and a controller for selectively delivering the voltage output of the fuel cell to the load, and periodically shunting the voltage output between the anode and cathode by selectively electrically coupling the electrical energy storage device to the anode and cathode, and wherein the voltage output of the fuel cell during the shunting is stored as an electrical charge by the electrical energy storage device, and wherein the electrical energy storage device is selectively discharged to deliver the stored electrical charge to the load.

Still another aspect of the present invention relates to a fuel cell having an anode and a cathode, and which produces an electrical power output which is delivered to a load, and which includes first electrical circuitry which selectively electrically couples a fuel cell having a voltage and electrical current output to a load; an output bus which is electrically coupled with each of the first electrical circuitry and with the load; second electrical circuitry which is electrically coupled to the first electrical circuitry, and wherein the first electrical circuitry shunts the electrical current and voltage output of the fuel cell between the anode and cathode thereof; a controller electrically coupled in controlling relation relative to the first and second electrical circuitry, and in voltage and electric current sensing relation relative to the electrical output of the fuel cell, and the voltage and current demand of the load; and an electrical energy storage device which is selectively electrically coupled with the second electrical circuitry and which stores the voltage and electric current output of the fuel cell when the first electrical circuitry shunts the voltage and electric current output of the fuel cell between the anode and cathode thereof, and wherein the electrical energy storage device is selectively electrically discharged by the second electrical circuitry to deliver the stored voltage and electric current output to the load.

These and other aspects will be discussed in greater detail below.

BRIEF DESCRIPTION OF THE DRAWING

Preferred embodiments of the invention are described below with reference to the following accompanying drawing.

FIG. 1 is a somewhat simplified, schematic view of a fuel cell which incorporates the teachings of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The fuel cell constituting the present invention is generally designated by the numeral 10 in FIG. 1. As shown therein, the invention 10 includes a fuel cell generally indicated by the numeral 11 and which has an anode 12, and a cathode 13. The anode 12 is connected to ground 14 by way of electrical conduit 15. The fuel cell 11 produces a voltage output which is supplied to a load which is generally designated by the numeral 20. The load 20 may include relatively low voltage loads such as internal auxiliary loads. The load 20 is coupled by way of an electrical conduit 21 with an output bus 30. It should be understood, that while one fuel cell 11 is shown, this device may be employed with multiple fuel cells. In the event that multiple fuel cells are employed, these fuel cells may be coupled serially or in parallel, or in combinations of both.

The present invention 10 includes first electrical circuitry which is generally indicated by the numeral 40. The first electrical circuitry, as a general matter, is operable to selectively electrically couple the fuel cell 11 having a voltage and electric current output to the load 20 as will be described, hereinafter. As seen in FIG. 1, a controller 41 is provided and which is electrically coupled in controlling relation relative the first electrical circuitry 40, and is also disposed in voltage, and electric current sensing relation relative to the electrical output of the fuel cell; and the voltage and current demand of the load 20. As seen in FIG. 1, the controller 41 is coupled to the first electrical circuitry 40 by way of a first electrical pathway 42, and a second electrical pathway 43. As illustrated, individual resistors 44 are electrically coupled to the respective pathways 42 and 43. Still further, a pair of switches 50 are made integral with the first electrical circuitry 40 and comprise a first electrical switch 51 and a second electrical switch 52. Each of the electrical switches 51 and 52 are electrically coupled to the controller 41. The controller 41 is operable to control the individual electrical switches to place them in various open and closed electrical conditions in order to facilitate the features of the present invention which will be discussed hereinafter.

As seen, the first electrical switch 51 is electrically coupled to the cathode 13, of the fuel cell 11 by way of a third electrical pathway 53. Still further, the cathode 13 of the fuel cell 11 is electrically coupled to the second electrical switch 52 by way of a fourth electrical pathway 54. Yet further, a fifth electrical pathway 55 electrically couples the first electrical switch with the output bus 30. As will be seen, the first electrical circuitry 40, and particularly the electrical pathways 42, 53 and 55; and the first electrical switch 51 are operable to selectively electrically couple and decouple the voltage output of the fuel cell 11 to the load 20 by way of the output bus 30. As should be understood, when the first electrical switch 51 is in a closed electrical condition, the voltage and current output of the fuel cell 11 is electrically coupled to the load 20. In contrast, when the first electrical switch 51 is in the open electrical condition, the voltage and current output of the fuel cell 11 is decoupled from the load 20.

As illustrated in FIG. 1, a shunt bus 60 is provided, and which is electrically coupled by way of a sixth electrical pathway 61 to the second electrical switch 52. Still further the shunt bus 60 is electrically coupled with second electrical circuitry which is generally indicated by the numeral 70. The second electrical circuitry includes a seventh electrical pathway 71. The seventh electrical pathway couples the shunt bus to the second electrical circuitry 70. Still further, an inductor 72 is electrically coupled to the seventh electrical pathway, and to ground 14 as illustrated.

The second electrical circuitry 70 further includes a plurality of energy storage devices which are generally indicated by the numeral 80, and which include first and second electrical energy storage devices 81 and 82. In one form of the invention, the inductor 72 may operate as one of the energy storage devices. These particular electrical energy storage devices 81 and 82 are electrically coupled in parallel to the seventh electrical pathway 71. As seen in FIG. 1, the first and second electrical energy storage devices 81 and 82 may comprise ultracapacitors which are commercially available from various sources. These ultracapacitors are operable to store relatively large amounts of electrical voltage and current. Suitable ultracapacitors may be purchased from manufacturers such as Maxwell. Each of the electrical energy storage devices 80 is electrically coupled to the second electrical circuitry 70 and to ground 14. As seen in FIG. 1, the first electrical energy storage device 81 is electrically coupled to an eighth electrical pathway 83. The eighth electrical pathway 83 is electrically coupled to the seventh electrical pathway 71. Still further, the second electrical energy storage device 82 is electrically coupled to a ninth electrical pathway 84. The ninth electrical pathway 84 is electrically coupled to the seventh electrical pathway 71. Still further, a tenth electrical pathway 85 is provided, and which electrically couples the eighth electrical pathway 83 and the first and second electrical energy storage devices 81 and 82 to the output bus 30. An eleventh electrical pathway 86 is also provided and which is electrically coupled to the bus 30.

As illustrated in FIG. 1, a pair of diodes, which are generally indicated by the numeral 90, are electrically coupled along the respective eighth and ninth electrical pathways 83 and 84, respectively; and between the first and second electrical energy storage devices 81 and 82, and the seventh electrical pathway 71. The pair of diodes 90 include a first electrical diode 91, which is electrically coupled to the eighth electrical pathway 83, and a second diode 92 which is electrically coupled to the ninth electrical pathway 84. Still further, a third diode, or voltage charge limiter 93 is made integral with the tenth electrical pathway 85, and is oriented between the eighth electrical pathway 83 and the output bus 30. A fourth diode or voltage charge limiter 96 may be used as an alternative to the eleventh electrical pathway 86 and which is oriented between the ninth electrical pathway 84 and the output bus 30. As further illustrated in FIG. 1, a sensor 94 is provided, and which is electrically coupled to the controller 41, and disposed in voltage and current sensing relation relative to the fuel cell 11. Still further, second sensor 95 is provided, and which is electrically coupled to the controller 41, and disposed in voltage and current sensing relation relative to the load 20. This arrangement facilitates the operation of the invention in the manner as described below. It should be understood that the fuel cell 11 has performance parameters comprising electric current and voltage outputs. In this regard, and during predetermined operating and duty cycles, the controller 41 periodically shunts, at predetermined intervals, and for predetermined periods of time, the voltage and current output of the fuel cell 11 between the anode 12 and the cathode 13 to cause a resulting increase in the voltage and current output of the fuel cell 11.

As should be understood, the operating and duty cycles are individually and selectively adjusted by the controller 41, at least in part, by reference to the performance parameters of the fuel cell 11. In particular, the shunting is performed by selectively electrically coupling the respective electrical energy storage devices 81 and 82 to the anode 12, and cathode 13 of the fuel cell 11. As will be recognized, while one fuel cell 11 is shown, the controller may shunt one, several, or combinations of different fuel cells based upon the demand of the load 20. More specifically, the first and second electrical circuitry 40 and 70 operate to selectively electrically couple and decouple the voltage and current output of the fuel cell 11 to the load 20; and the electrical energy storage devices 80. As illustrated in FIG. 1, electrical circuitry 20 may be replicated several times. Each of these several identical circuits 70 may then be selectively serially coupled to the load 20. In the arrangement as illustrated, and following the electrical coupling of the fuel cell 11 to the electrical energy storage devices 80, the electrical energy storage device 80 has an electrically charged condition. As discussed above, the controller 41 is coupled in electrical charge sensing relation relative to each of the electrical energy storage devices 80. In particular, the controller 41 is operable, upon sensing an electrically charged condition of the electrical energy storage devices 80, in one form of the invention, to control the electrical discharge of the respective electrical energy storage devices 80 to affect the delivery of the electrical charge stored by the respective electrical energy storage device 80 to the load 20. This is electrical charging and discharging is achieved by controlling the electric state (open or closed) of the respective electrical switches 51 and 52. In this regard it should be understood, that the energy storage devices 81 and 82 are alternatively charged and discharged. Still further, and as seen in FIG. 1, a voltage charge limiter in the form of a diode 93 is made integral with the second electrical circuitry 70, and which regulates the amount of electrical charge stored by the respective electrical energy storage devices 80 by selectively discharging the electrical energy storage devices when the electrical energy storage devices have a predetermined electrically charged condition. As will be appreciated, and in still another form of the invention, an electrical switch may be substituted for the voltage charge limiter 93, and which may be controlled by the controller 41 to provide selective discharge of the electrical energy storage devices 80.

As will be appreciated from a study of FIG. 1, the load 20 has a voltage and current demand, and the invention provides as a further advantage a convenient means by which the plurality of electrical energy storage devices 80 may be selectively electrically charged and discharged in a manner to provide increased electrical power. In still another aspect of the invention, this arrangement of the respective electrical energy storage devices may be discharged in a fashion such that the electrical power provided by same, when additively combined with the voltage and current output of the fuel cell 11, does not exceed the voltage and current demand of the load 20. As will be appreciated, the voltage output of the energy storage devices 81 and 82 is normally much less than the voltage demand of the load 20.

To facilitate the charging of the respective electrical energy storage devices 81 and 82, the controller 41 is operable to selectively electrically open and close the first and second electrical switches 51 and 52, respectively. In a first operational condition, when the first electrical switch 51 is in a closed electrical state, and the second electrical switch is in the open electrical state, the voltage and current output of the fuel cell 11 is provided to the output bus 30 for further delivery to the load 20. In a second operational condition, and where the controller 41 is effecting the shunting of the voltage and current output between the anode 12 and cathode 13 of the fuel cell 11, the first electrical switch 51 is caused by the controller 41 to be placed in an open electrical condition, and the second electrical switch 52 is caused to be placed in a closed electrical condition, thereby effectively electrically coupling the first and second electrical energy storage devices 81 and 82 to the anode 12 and the cathode 13. When this occurs, the voltage and current output of the fuel cell 11 is delivered to the respective electrical energy storage devices 81 and 82 in the manner as described below.

In the present arrangement, upon initiation of the electrical shunt by the opening of the electrical switch 51, and the closing of the electrical switch 52, energy is directed to the electrical energy storage device 72, and which creates a first voltage and current spike. This first voltage and current spike is captured, or stored as an electrical charge by the first electrical energy storage device 81. Further, when the controller 41 terminates the electrical shunt, second electrical switch 52 is placed in an open electrical condition, and the first electrical switch 51 is place in a closed electrical condition. When this occurs, a second voltage and current spike occurs which has an opposite polarity to that which occurred when the electrical shunting was initiated. This second voltage and current spike is captured, or stored, as an electrical charge by the second electrical energy storage device 82. As discussed above, the voltage charge limiter 93 is made integral with the second electrical circuitry 70 and which regulates the amount of electrical charge stored by the electrical energy storage devices 80 by selectively discharging the electrical energy storage devices when the electrical energy storage devices have a predetermined electrically charged condition. As seen, the voltage charge limiter 93 delivers the voltage previously stored by the electrical energy storage devices 81 to the output bus 30 for delivery to the load 20. In the arrangement as seen in FIG. 1, the energy storage device 82 captures negative voltage with respect to the ground 14 and which results from the periodic duty cycle as controlled by the controller 41. The controller 41 is operable to sense the voltage and current demand of the load 95 and cause the periodic shunting of the fuel cell 11 to meet the demand of the load, and to cause the electrical charging of the respective electrical energy storage devices 80.

Operation

The operation of the described embodiments of the present invention are believed to be readily apparent and are briefly summarized at this point.

As seen in FIG. 1, the present invention 10 is shown and which includes a fuel cell 11, having an anode 12, and a cathode 13 and which produces a voltage and current output which is supplied to a load 20. An electrical energy storage device 80 is provided; and a controller 41 is electrically coupled to the fuel cell 11, and which periodically electrically shunts the voltage and current output of the fuel cell between the anode and cathode thereof by electrically coupling the electrical energy storage devices 80 to the anode and cathode of the fuel cell.

As presently disclosed, the electrical energy storage devices 80 may include an inductor 71, capacitor 81, and/or 82, or an inductor and a capacitor. As illustrated, and discussed above, the controller 41 is coupled in electrical charge sensing relation relative the electrical energy storage devices 80. The controller 41 is further operable upon sensing an electrical charge condition of the electrical energy storage devices 80 to controllably discharge the electrical energy storage devices 80 to effect delivery of the electrical voltage stored by the electrical energy storage devices to the load 20.

As presently disclosed, the fuel cell 11 has performance parameters comprising current and voltage outputs and operating and duty cycles. In this regard, the controller 41 periodically electrically shunts the voltage and current output of the fuel cell between the anode 12 and cathode 13 thereof during the operating and duty cycles. In this regard, the operating and duty cycles are individually and selectively adjusted by the controller 41 at least in part by reference to the performance parameters of the fuel cell 11. In order to allow for controllable discharge of the electrical charge stored by the electrical energy storage devices 80, a voltage charge limiter 93 is provided and which selectively discharges the electrical energy storage device 80 when the electrical energy storage device has a predetermined electrically charged condition. In an alternative form of the invention, an electrical switch may replace the voltage charge limiter 93 and be under the direct control of the controller 41.

The invention 10 as disclosed in FIG. 1, includes a fuel cell 11 having an anode 12 and a cathode 13 and which produces an electric power output which is delivered to a load 20. The invention includes first electrical circuitry 40 which selectively electrically couples the fuel cell 11 having a voltage and current output to a load 20. Still further, an output bus 30 is provided, and which is electrically coupled with each of the first electrical circuitry, and with the load 20. Second electrical circuitry 70 is provided, and which is electrically coupled to the first electrical circuitry 40. As illustrated, the first electrical circuitry electrically shunts the electrical current and voltage output of the fuel cell 11 between the anode 12 and cathode 13 thereof. A controller 41 is provided and which is coupled in controlling relation relative to the first and the second electrical circuitry 40 and 70, and is further in voltage and electric current sensing relation relative to the electrical power output of the fuel cell 94, and the voltage and current demand of the load 95. Finally, an electrical energy storage device 80 is provided and which is selectively electrically coupled to the second electrical circuitry 70 and which stores the voltage and electric current output of the fuel cell 11 when the first electrical circuitry shunts the voltage and electric current output of the fuel cell 11 between the anode and cathode thereof. The electrical energy storage device 80 is selectively electrically discharged to deliver the stored voltage and current output to the load.

Therefore it will be seen that the fuel cell of the present invention provides a convenient means by which the performance of a prior art fuel cell can be increased, and further electrical output can be realized in a fashion not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fuel cell comprising:
   a fuel cell having an anode and a cathode and which produces a voltage output which is supplied to a load;
   an electrical energy storage device; and
   a controller electrically coupled to the fuel cell, and which periodically shunts the voltage output of the fuel cell between the anode and cathode by electrically coupling the electrical energy storage device to the anode and cathode of the fuel cell.

2. A fuel cell as claimed in claim 1, and wherein the electrical energy storage device comprises a capacitor.

3. A fuel cell as claimed in claim 1, and wherein the electrical energy storage device comprises an inductor.

4. A fuel cell as claimed in claim 1, and wherein the electrical energy storage device comprises an inductor and a capacitor.

5. A fuel cell as claimed in claim 1, and further comprising:
   an electrical circuit which electrically couples the load with the fuel cell, electrical energy storage device, and the controller.

6. A fuel cell as claimed in claim 1, and further comprising;
   an electrical circuit for selectively electrically coupling and decoupling the voltage output of the fuel cell to the load, and the electrical energy storage device, and wherein the electrical energy storage device has an electrically charged condition, and wherein the controller is coupled in electrical charge sensing relation relative to the electrical energy storage device, and wherein the controller, upon sensing an electrical charged condition of the electrical energy storage device controllably discharges the electrical energy storage device to effect the delivery of the voltage stored by the electrical energy storage device to the load.

7. A fuel cell as claimed in claim 1, and further comprising:
   an electrical circuit for selectively electrically coupling and decoupling the voltage output of the fuel cell to the load, and the electrical energy storage device, and wherein the electrical energy storage device has an electrically charged condition; and
   a voltage charge limiter made integral with the electrical circuit, and which regulates the amount of electrical charge stored by the energy storage device by selectively discharging the electrical energy storage device when the electrical energy storage device has a predetermined electrically charged condition.

8. A fuel cell as claimed in claim 1, and wherein the controller electrically couples the electrical energy storage device to the voltage output of the fuel cell at predetermined intervals.

9. A fuel cell as claimed in claim 1, and wherein the controller shunts the voltage output of the fuel cell between the anode and the cathode at predetermined intervals and for predetermined periods of time, and wherein the controller selectively discharges the electrical energy storage device.

10. A fuel cell as claimed in claim 1, and further comprising:
a voltage sensor electrically coupled to the controller and disposed in voltage sensing relation relative to the fuel cell; and
an electric current sensor electrically coupled to the controller and disposed in current sensing relation relative to the fuel cell, and wherein the fuel cell has performance parameters comprising current and voltage outputs, and a duty cycle, and wherein during the duty cycle the controller shunts the voltage output of the fuel cell between the anode and cathode to cause a resulting increase in the voltage and current output of the fuel cell.

11. A fuel cell as claimed in claim 1, and further comprising:
a voltage sensor electrically coupled to the controller and disposed in voltage sensing relation relative to the fuel cell; and
an electric current sensor electrically coupled to the controller, and disposed in current sensing relation relative to the fuel cell, and wherein the fuel cell has performance parameters comprising current and voltage outputs, and a duty cycle, and wherein in a first operational condition, the voltage output of the fuel cell is less than the performance parameters; and wherein in a second operational condition the controller periodically shunts the voltage output of the fuel cell during the duty cycle between the anode and cathode to cause a resulting increase in the voltage and current output of the fuel cell.

12. A fuel cell as claimed in claim 1, and further comprising:
a voltage sensor electrically coupled to the controller and disposed in voltage sensing relation relative to the fuel cell; and
an electric current sensor electrically coupled to the controller, and disposed in current sensing relation relative to the fuel cell, and wherein the fuel cell has performance parameters comprising current and voltage outputs, and operating and duty cycles, and wherein the controller periodically shunts the voltage output of the fuel cell between the anode and cathode during the operating and duty cycles, and wherein the operating and duty cycles are individually and selectively adjusted by the controller at least in part by reference to the performance parameters of the fuel cell.

13. A fuel cell having an anode and a cathode and which produces an electrical current having a voltage output, and which is delivered to a load, comprising:
an electrical energy storage device which is selectively electrically coupled to the fuel cell and which is further electrically coupled to the load; and
a controller for selectively delivering the voltage output of the fuel cell to the load, and periodically shunting the voltage output between the anode and cathode by selectively electrically coupling the electrical energy storage device to the anode and cathode, and wherein the voltage output of the fuel cell during the shunting is stored as an electrical charge by the electrical energy storage device, and wherein the electrical energy storage device is selectively discharged to deliver the stored electrical charge to the load.

14. A fuel cell as claimed in claim 13, and further comprising:
an electrical circuit which electrically couples the load with the fuel cell, electrical energy storage device and the controller.

15. A fuel cell as claimed in claim 14, and further comprising:
an output bus which is electrically coupled with the electrical circuit and which electrically couples the voltage output of the fuel cell with the load.

16. A fuel cell as claimed in claim 15, and wherein the electrical energy storage device is electrically coupled by the electrical circuit to the output bus.

17. A fuel cell as claimed in claim 16, and wherein the electrical energy storage device has an electrically charged condition, and wherein the controller is coupled in electrical charge sensing relation relative to the electrical energy storage device by way of the electrical circuit, and wherein the controller, upon sensing an electrical charged condition of the electrical energy storage device controllably discharges the electrical energy storage device to effect the delivery of the voltage stored by the electrical energy storage device to the load.

18. A fuel cell as claimed in claim 16, and further comprising:
a voltage charge limiter made integral with the electrical circuit, and wherein the energy storage device has an electrically charged state, and wherein the voltage charge limiter regulates the amount of the electrical charge stored by the energy storage device by selectively discharging the electrical energy storage device when the electrical energy storage device has a predetermined electrically charge condition.

19. A fuel cell as claimed in claim 13, and wherein the energy storage device has an electrically charged state, and wherein the controller shunts the voltage output of the fuel cell between the anode and the cathode at predetermined intervals and for predetermined periods of time, and wherein the controller selectively discharges the electrical energy storage device when the electrical energy storage device has a predetermined electrically charged condition.

20. A fuel cell as claimed in claim 19, and wherein the predetermined intervals and predetermined periods of time for the shunting are substantially fixed.

21. A fuel cell as claimed in claim 19, and wherein the predetermined intervals, and predetermined periods of time for the shunting are variable.

22. A fuel cell as claimed in claim 19, and wherein the fuel cell has performance parameters comprising current and voltage outputs, and a duty cycle, and wherein the controller periodically shunts the voltage output of the fuel cell between the anode and the cathode by electrically coupling the electrical energy storage device to the anode and cathode of the fuel cell when the fuel cell has declining performance characteristics.

23. A fuel cell as claimed in claim 22, and wherein the electrical energy storage device when electrically coupled to the anode and the cathode during the periodic shunting electrically stores the voltage output of the fuel cell to cause the electrical energy storage device to have an electrically charged state, and wherein the controller selectively discharges the electrical energy storage device when the electrical energy storage device has a predetermined electrical charge.

24. A fuel cell as claimed in claim 23, and wherein the electrical energy storage device includes a plurality of electrical energy storage devices.

25. A fuel cell as claimed in claim 24, and wherein the load has a voltage and current demand, and wherein the plurality of electrical energy storage devices are selectively electrically discharged in a manner to provide electrical power, which, when additively combined with the voltage and current output of the fuel cell does not exceed the voltage and current demand of the load.

26. A fuel cell having an anode and a cathode and which produces an electric power output which is delivered to a load, comprising:

first electrical circuitry which selectively electrically couples a fuel cell having a voltage and an electric current output to a load;

an output bus which is electrically coupled with each of the first electrical circuitry and with the load;

second electrical circuitry which is electrically coupled to the first electrical circuitry and, wherein the first electrical circuitry shunts the electrical current and voltage output of the fuel cell between the anode and cathode thereof;

a controller electrically coupled in controlling relation relative to the first and second electrical circuitry and in voltage and electric current sensing relation relative to the electrical output of the fuel cell, and the voltage and current demand of the load; and an electrical energy storage device which is selectively electrically coupled with the second electrical circuitry and which stores the voltage and electric current output of the fuel cell when the first electrical circuitry shunts the voltage and electric current output of the fuel cell between the anode and cathode thereof, and wherein the electrical energy storage device is selectively electrically discharged by the second electrical circuitry to deliver the stored voltage and electric current output to the load.

27. A fuel cell as claimed in claim 26, and wherein the electrical energy storage device comprises a capacitor.

28. A fuel cell as claimed in claim 26, and wherein the electrical energy storage device comprises an inductor.

29. A fuel cell as claimed in claim 26, and wherein the electrical energy storage device comprises and inductor and a capacitor.

30. A fuel cell as claimed in claim 26, and wherein the first electrical circuitry comprises:

a first electrical switch which is made integral with the first electrical circuitry and which is under the influence of the controller, and which selectively electrically couples and decouples the electrical current and voltage output of the fuel cell to the output bus; and a second electrical switch which is made integral with the first electrical circuitry and which is under the influence of the controller, and wherein the controller causes the second electrical switch to be placed in an electrical condition wherein the electrical current and the voltage output of the fuel cell is electrically coupled to the electrical energy storage device to effect the shunt.

31. A fuel cell as claimed in claim 30, and wherein the first electrical switch has a first closed electrical state which facilitates the delivery of the electrical current and voltage output of the fuel cell to the output bus, and a second open electrical state which substantially prohibits the delivery of the electrical current and voltage output of the fuel cell to the fuel cell, and wherein the second electrical switch has a first closed electrical state which facilitates the shunting of the electrical current output of the fuel cell between the anode and cathode thereof by electrically coupling the energy storage device to the fuel cell, and a second open electrical state which substantially prohibits the shunting of the electrical current and voltage output of the fuel cell between the anode and cathode thereof, and wherein the controller causes the respective first and second electrical switches to be periodically placed into opposite alternative electrical states one relative to the other.

32. A fuel cell as claimed in claim 31, and wherein the shunting of the electrical current and the voltage output of the fuel cell between the anode and cathode thereof occurs for periodic time periods, and wherein during the shunting time period the controller causes the first electrical switch to be placed in the second open electrical state, and the second electrical switch to be placed in the first closed electrical state, and wherein after the time period for shunting the controller causes the first electrical switch to be placed in the first closed electrical state, and the second electrical switch to be placed in the second open electrical condition.

33. A fuel cell as claimed in claim 26, and wherein the electrical energy storage device has an electrically charged condition, and wherein the second electrical circuitry further comprises:

a voltage charge limiter made integral with the second electrical circuitry and which regulates the amount of the electrical charge which is stored by the electrical energy storage device by selectively electrically discharging the electrical energy storage device when the electrical energy storage device has a predetermined electrically charged condition.

34. A fuel, cell as claimed in claim 26, and wherein the load has a voltage and electrical current demand, and wherein the electrical energy storage device includes a plurality of electrical energy storage devices, and wherein the plurality of electrical energy storage devices are selectively electrically discharged in a manner to provide electrical power, which, when additively combined with the voltage and current output of the fuel cell does not exceed the voltage and electrical current demand of the load.

35. A fuel cell as claimed in claim 26, and wherein the controller periodically shunts the current and voltage output of the fuel cell between the anode and cathode to cause a resulting increase in the voltage and current output of the fuel cell.

36. A fuel cell as claimed in claim 26, and wherein the fuel cell has predetermined performance parameters, and wherein the controller periodically shunts the voltage and electrical current output of the fuel cell between the anode and cathode thereof when the predetermined performance parameters are declining.

* * * * *